United States Patent
Hayashi et al.

(10) Patent No.: US 10,742,365 B2
(45) Date of Patent: Aug. 11, 2020

(54) APPARATUS AND METHOD FOR RADIO COMMUNICATION

(71) Applicant: NEC CORPORATION, Tokyo (JP)

(72) Inventors: Sadafuku Hayashi, Tokyo (JP); Daisuke Ogura, Tokyo (JP); Hisashi Futaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 161 days.

(21) Appl. No.: 15/751,721

(22) PCT Filed: Sep. 7, 2016

(86) PCT No.: PCT/JP2016/076316
§ 371 (c)(1),
(2) Date: Feb. 9, 2018

(87) PCT Pub. No.: WO2017/043534
PCT Pub. Date: Mar. 16, 2017

(65) Prior Publication Data
US 2018/0241516 A1    Aug. 23, 2018

(30) Foreign Application Priority Data

Sep. 11, 2015    (JP) .................................. 2015-179745

(51) Int. Cl.
*H04L 29/08* (2006.01)
*H04W 48/16* (2009.01)
(Continued)

(52) U.S. Cl.
CPC .............. *H04L 1/1864* (2013.01); *H04W 4/00* (2013.01); *H04W 28/02* (2013.01); *H04W 48/18* (2013.01); *H04W 80/06* (2013.01); *H04W 88/06* (2013.01)

(58) Field of Classification Search
CPC ...... H04L 1/1864; H04W 28/02; H04W 4/00; H04W 74/04; H04W 48/18; H04W 80/06; H04W 88/06; H04W 48/16; H04B 7/2621
(Continued)

(56) References Cited

U.S. PATENT DOCUMENTS

| 9,998,944 B2 * | 6/2018 | Wang ................. H04N 21/2365 |
| 2004/0052234 A1 * | 3/2004 | Ameigeiras ........... H04L 1/1642 370/338 |

(Continued)

FOREIGN PATENT DOCUMENTS

| CN | 102215530 A | 10/2011 |
| CN | 103703853 A | 4/2014 |

(Continued)

OTHER PUBLICATIONS

3GPP TS 36.300 V13.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Jun. 2015, pp. 1-254.

(Continued)

*Primary Examiner* — Edan Orgad
*Assistant Examiner* — Vanneilian Lalchinthang
(74) *Attorney, Agent, or Firm* — Sughrue Mion, PLLC

(57) ABSTRACT

To enable delivery confirmation for data transmitted from a base station to a terminal apparatus via the access point. An apparatus according to an example aspect of the present invention includes an information acquisition unit configured to acquire a data unit from a packet data convergence protocol (PDCP) layer of a base station, and a communication processing unit configured to transmit the data unit to a (Continued)

terminal apparatus via an access point of a wireless local area network using a protocol enabling delivery confirmation.

15 Claims, 13 Drawing Sheets

(51) Int. Cl.
*H04L 1/18* (2006.01)
*H04W 80/06* (2009.01)
*H04W 28/02* (2009.01)
*H04W 88/06* (2009.01)
*H04W 4/00* (2018.01)
*H04W 48/18* (2009.01)

(58) Field of Classification Search
USPC .......................................................... 370/328
See application file for complete search history.

(56) References Cited

U.S. PATENT DOCUMENTS

| | | | |
|---|---|---|---|
| 2009/0168723 A1* | 7/2009 | Meylan | H04L 1/1841 370/331 |
| 2012/0327913 A1 | 12/2012 | Wang et al. | |
| 2014/0050086 A1* | 2/2014 | Himayat | H04N 21/2365 370/230 |
| 2014/0079007 A1* | 3/2014 | Li | H04W 28/10 370/329 |
| 2015/0043440 A1 | 2/2015 | Ko et al. | |
| 2015/0146614 A1* | 5/2015 | Yu | H04L 5/0032 370/328 |
| 2015/0326456 A1* | 11/2015 | Dudda | H04L 43/062 370/252 |
| 2016/0219466 A1* | 7/2016 | Uchino | H04W 36/0055 |
| 2016/0323919 A1 | 11/2016 | Xu et al. | |
| 2017/0041100 A1 | 2/2017 | Xie et al. | |
| 2017/0078914 A1* | 3/2017 | Fujishiro | H04W 28/04 |
| 2017/0353914 A1* | 12/2017 | Jung | H04W 48/18 |

FOREIGN PATENT DOCUMENTS

| | | |
|---|---|---|
| CN | 104349414 A | 2/2015 |
| CN | 104753627 A | 7/2015 |
| EP | 2704481 A1 | 3/2014 |
| EP | 3142409 A1 | 3/2017 |
| JP | 2015-50592 A | 3/2015 |
| WO | 2012/148482 A1 | 11/2012 |
| WO | 2015/105383 A1 | 7/2015 |
| WO | 2015/170722 A1 | 11/2015 |

OTHER PUBLICATIONS

3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015, pp. 1-40.
Broadcom Corporation, "RP-150753: On the impacts of LTE—WLAN Aggregation on WLAN Nodes and terminals", pp. 1-11.
Broadcom Corporation, "User Plane Architecture solutions based on DuCo Solution 3C", 3GPP TSG-RAN WG2 #91, R2-153723, May 24-28, 2015, pp. 1-4, Beijing, P.R. China.
Fujitsu, "Flow control and feedback for LWA", 3GPP TSG-RAN WG2 Meeting #90 R2-152188, Apr. 25-29, 2015, pp. 1-3, Fukuoka, Japan.
CATT, "Discussion on UP Architecture of LTE/WLAN Aggregation", 3GPP TSG RAN WG2 Meeting #89bis, R2-151298, Apr. 20-24, 2015, pp. 1-7, Bratislava, Slovakia.
International Search Report of PCT/JP2016/076316 dated Dec. 6, 2016 [PCT/ISA/210].
Decision to Grant a Patent dated May 14, 2019 issued by the Japanese Patent Office in counterpart application No. 2017-539193.
Written Opinion issued by the International Searching Authority dated Dec. 6, 2016 in PCT/JP2016/076316.
Extended European Search Report dated Jan. 22, 2019 issued by the European Patent Office in counterpart application No. 16844395.0.
Communication dated May 6, 2020, from The China National Intellectual Property Administration in Application No. 201680051933.0.

\* cited by examiner

APPARATUS AND METHOD FOR RADIO COMMUNICATION

CROSS REFERENCE TO RELATED APPLICATIONS

This application is a National Stage of International Application No. PCT/JP2016/076316, filed Sep. 7, 2016, claiming priority based on Japanese Patent Application No. 2015-179745, filed Sep. 11, 2015.

BACKGROUND

Technical Field

The present disclosure relates to an apparatus and method for radio communication.

Background Art

Layer 2 in Long Term Evolution (LTE) is constituted of three sublayers of medium access control (MAC), radio link control (RLC), and packet data convergence protocol (PDCP) (see NPL 1). In three sublayers above, the RLC has a delivery confirmation function (a Status Report in an RLC AM mode) (see NPL 2). For example, the RLC notifies the PDCP (i.e., a higher layer of the RLC layer) of whether or not data reaches, and, for example, the PDCP, if notified of that the data reaches, advances a re-ordering window, deletes the data from a buffer, and give a sequence number to new data not assigned with a sequence number.

On the other hand, in 3rd Generation Partnership Project (3GPP), there has been considered a technology for communicating with UE by use of both an evolved Node B (eNB) in LTE and an access point (AP) of a wireless local area network (WLAN) (i.e., LTE-WLAN aggregation) (see NPL 3). For example, in the LTE-WLAN aggregation, a data path is split in a layer lower than the PDCP. To be more specific, a PDCP packet data unit (PDU) is directly transmitted from the eNB to the UE using the RLC, MAC and the like, and another PDCP PDU is transmitted from eNB to the UE via the AP of the WLAN, for example.

[NPL 1] 3GPP TS 36.300 V13.0.0 (2015-06) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)

[NPL 2] 3GPP TS 36.322 V12.2.0 (2015-03) 3rd Generation Partnership Project; Technical Specification Group Radio Access Network; Evolved Universal Terrestrial Radio Access (E-UTRA); Radio Link Control (RLC) protocol specification (Release 12)

[NPL 3] RP-150753: On the impacts of LTE-WLAN Aggregation on WLAN Nodes and terminals Broadcom Corporation

SUMMARY

Technical Problem

However, as described in NPL 3, in the case that the data path is split in a layer lower than the PDCP in the LTE-WLAN aggregation, the RLC is not used for data transmission via the AP of the WLAN, and delivery confirmation for the data may not be performed. For example, even if the data loss occurs between the eNB and the AP or between the AP and the UE, the eNB does not detect the data loss. As a result, the data may be stagnated in a buffer managed in the PDCP. This may likely delay the data transmission, and may likely cause further data loss due to buffer overflow.

An example object of the present invention is to enable delivery confirmation for data transmitted from a base station to a terminal apparatus via an access point.

Solution to Problem

A first apparatus according to an example aspect of the present invention includes: an information acquisition unit configured to acquire a data unit from a Packet Data Convergence Protocol (PDCP) layer of a base station; and a communication processing unit configured to transmit the data unit to a terminal apparatus via an access point of a wireless local area network, using a protocol enabling delivery confirmation.

A second apparatus according to an example aspect of the present invention includes: an information acquisition unit configured to acquire a data unit from a PDCP layer of a base station, the data unit being transmitted to a terminal apparatus via an access point of a wireless local area network, using a protocol enabling delivery confirmation; and a communication processing unit configured to perform reception processing of the data unit in the terminal apparatus.

A first method according to an example aspect of the present invention includes: acquiring a data unit from a PDCP layer of a base station; and transmitting the data unit to a terminal apparatus via an access point of a wireless local area network, using a protocol enabling delivery confirmation.

A second method according to an example aspect of the present invention includes: acquiring a data unit from a PDCP layer of a base station, the data unit being transmitted to a terminal apparatus via an access point of a wireless local area network using a protocol enabling delivery confirmation; and performing reception processing of the data unit in the terminal apparatus.

Advantageous Effects of Invention

According to an example aspect of the present invention, it is possible to make delivery confirmation for data transmitted from a base station to a terminal apparatus via an access point. Note that according to an example aspect of the present invention, instead of or together with the above effect, other effects may be exerted.

DESCRIPTION OF THE EMBODIMENTS

Hereinafter, exemplary embodiments of the present invention will be described in detail with reference to the accompanying drawings. Note that in the present description and drawing, the components capable of being described in the same way may be designated by the same reference signs to omit a duplicated description.

Description is given in the following order.
1. Overview of Exemplary Embodiments of the Present Invention
2. First Exemplary Embodiment
   2.1. Configuration Example of System
   2.2. Configuration Example of Gateway
   2.3. Configuration Example of Base Station
   2.4. Configuration Example of Terminal Apparatus
   2.5. Technical Features
3. Second Exemplary Embodiment
   3.1. Configuration Example of System
   3.2. Configuration Example of Base Station
   3.3. Configuration Example of Terminal Apparatus
   3.4. Technical Features
4. Third Exemplary Embodiment
   4.1. Configuration Example of System
   4.2. Configuration Example of Gateway
   4.3. Configuration Example of Terminal Apparatus
   4.4. Technical Features 1. Overview of Exemplary Embodiments of the Present Invention First, an overview of exemplary embodiments of the present invention will be described.

(1) Technical Problem

In a case that a data path is split in a layer lower than PDCP in LTE-WLAN aggregation, RLC is not used for data transmission via an AP of a WLAN, and delivery confirmation for the data may not be performed. For example, even if the data loss occurs between an eNB and the AP or between the AP and UE, the eNB does not detect the data loss. As a result, data may be stagnated in a buffer managed in the PDCP. This may likely delay the data transmission, and may likely cause further data loss due to buffer overflow.

(2) Technical Feature

In the exemplary embodiments according to the present invention, the eNB or gateway transmits a PDCP packet (i.e., PDCP PDU) from the eNB to the UE via the AP using a transmission control protocol (TCP) (or, another protocol enabling delivery confirmation), for example. The UE performs reception processing of the PDCP packet in a PDCP layer of the UE.

This enables delivery confirmation for data transmitted from the eNB to the UE via the AP, for example.

Note that the technical feature described above is a concrete example of the exemplary embodiments of the present invention, and, of course, the exemplary embodiments of the present invention are not limited to the technical feature described above.

2. First Exemplary Embodiment

Next, a first exemplary embodiment of the present invention will be described with reference to FIG. 1 to FIG. 6.

<2.1. Configuration Example of System>

Figure 1:
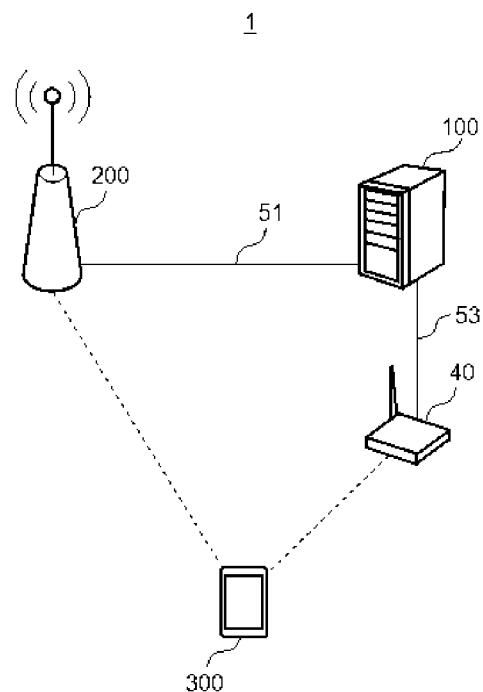
FIG. 1 is an explanatory diagram illustrating an example of a schematic configuration of a system according to a first exemplary embodiment.

First, an example of a configuration of a system 1 according to the first exemplary embodiment will be described with reference to FIG. 1. FIG. 1 is an explanatory diagram illustrating an example of a schematic configuration of the system 1 according to the first exemplary embodiment. Referring to FIG. 1, the system 1 includes a gateway 100, a base station (eNB) 200, a terminal apparatus (UE) 300, and an access point 40. The gateway 100 and the base station 200 transmit and receive signals via a network 51, and the gateway 100 and the access point 40 transmit and receive signals via a network 53.

For example, each of the gateway 100, the base station 200, and the terminal apparatus 300 may be a node/entity complying with the standards defined in Third Generation Partnership Project (3GPP). To be more specific, each of the gateway 100, the base station 200, and the terminal apparatus 300 may be a node/entity complying with Long Term Evolution (LTE)/LTE-Advanced, for example. For example, the gateway 100 may be a WLAN termination (WT). Of course, the gateway 100, the base station 200, and the terminal apparatus 300 are not limited to these examples.

(1) Base Station 200

The base station 200 is a node of a radio access network (RAN), and performs radio communication with a terminal apparatus positioned in a coverage of the base station 200 (e.g., terminal apparatus 300). For example, the base station 200 is an eNB.

(2) Access Point 40

The access point 40 is an access point for radio access technology (RAT) (e.g., LTE) different from RAT for the base station 200, and performs radio communication with a terminal apparatus (e.g., terminal apparatus 300). For example, the former RAT is a wireless local area network (WLAN), and the access point 40 is an access point of the WLAN. To be more specific, for example, the access point 40 is an access point complying with any of IEEE802.11 series (IEEE802.11b/a/g/n/ac/ad/j, or the like).

Note that the former RAT described above is not limited to a WLAN, and the access point 40 is not limited to an access point of a WLAN. As one example, the former RAT described above may be a wireless personal area network (WPAN) (specifically, Bluetooth (registered trademark), ultra wideband (UWB) or ZigBee (registered trademark), or the like), and the access point 40 may be an access point in a WPAN or comply with any of IEEE802.15 series. As another example, the former RAT described above may be a wireless metropolitan area network (WMAN) (specifically, worldwide interoperability for microwave access (WiMAX (registered trademark)), flash-OFDM (registered trademark), or iBurst (registered trademark), or the like), and the access point 40 may be an access point in a WMAN or comply with any of IEEE802.16 series or any of IEEE802.20 series. The access point 40 may be referred to as not an "access point" but a "base station".

(3) Terminal Apparatus 300

The terminal apparatus 300 performs radio communication with the base station 200. For example, the terminal apparatus 300 performs radio communication with the base station 200 when positioned in the coverage of the base station 200.

Further, the terminal apparatus 300 performs radio communication with the access point 40. For example, the terminal apparatus 300 performs radio communication with the access point 40 when positioned in a coverage of the access point 40.

(4) Gateway 100

Particularly in the exemplary embodiments of the present invention, the base station 200 not only communicates with directly the terminal apparatus 300 but also communicates with the terminal apparatus 300 via the access point 40. For example, the gateway 100 receives data from the base station 200 to transmit, instead of the base station 200, the data to the terminal apparatus 300 via the access point 40. Further, for example, the gateway 100 receives, instead of the base station 200, data transmitted from the terminal apparatus 300 via the access point 40 to transmit the data to the base station 200.

<2.2. Configuration Example of Gateway>

Figure 2:
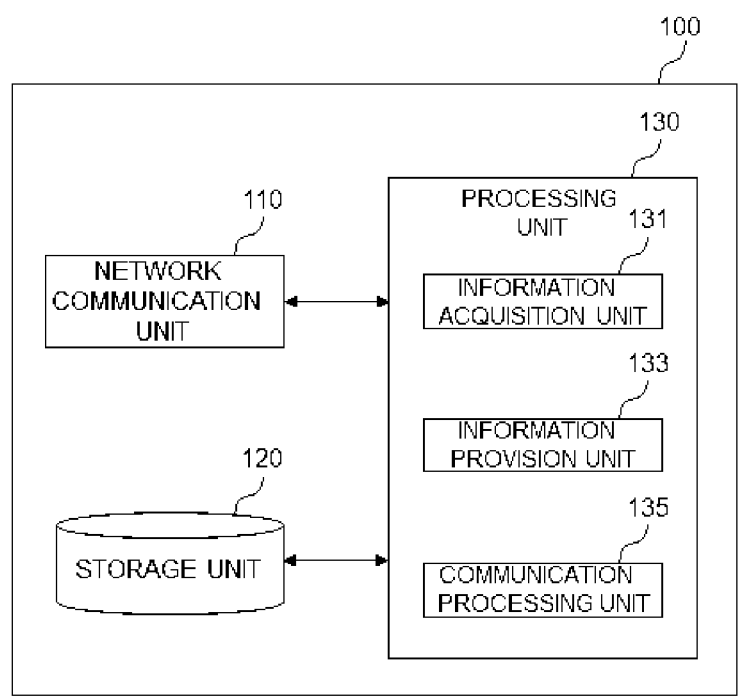
FIG. 2 is a block diagram illustrating an example of a schematic configuration of a gateway according to the first exemplary embodiment.

Next, an example of a configuration of the gateway 100 according to the first exemplary embodiment will be described with reference to FIG. 2. FIG. 2 is a block diagram illustrating an example of a schematic configuration of the gateway 100 according to the first exemplary embodiment. Referring to FIG. 2, the gateway 100 includes a network communication unit 110, a storage unit 120, and a processing unit 130.

The network communication unit 110 receives a signal from the network 51 and transmits a signal to the network 51. The network communication unit 110 also receives a signal from the network 53 and transmits a signal to the network 53.

The storage unit 120 transitorily or permanently stores programs and parameters for an operation of the gateway 100, and various pieces of data.

The processing unit 130 provides various functions of the gateway 100. The processing unit 130 includes an information acquisition unit 131, an information provision unit 133, and a communication processing unit 135. Note that the processing unit 130 may further include other components than these components. In other words, the processing unit 130 may perform other operations than the operations of these components.

Concrete operations of the information acquisition unit 131, information provision unit 133, and communication processing unit 135 are described later in detail.

The network communication unit 110 may include a network adapter, a network interface card or the like. The storage unit 120 may include a memory (e.g., non-volatile memory and/or volatile memory) and/or a hard disk or the like. The processing unit 130 may include a processor or the like.

<2.3. Configuration Example of Base Station>

Figure 3:
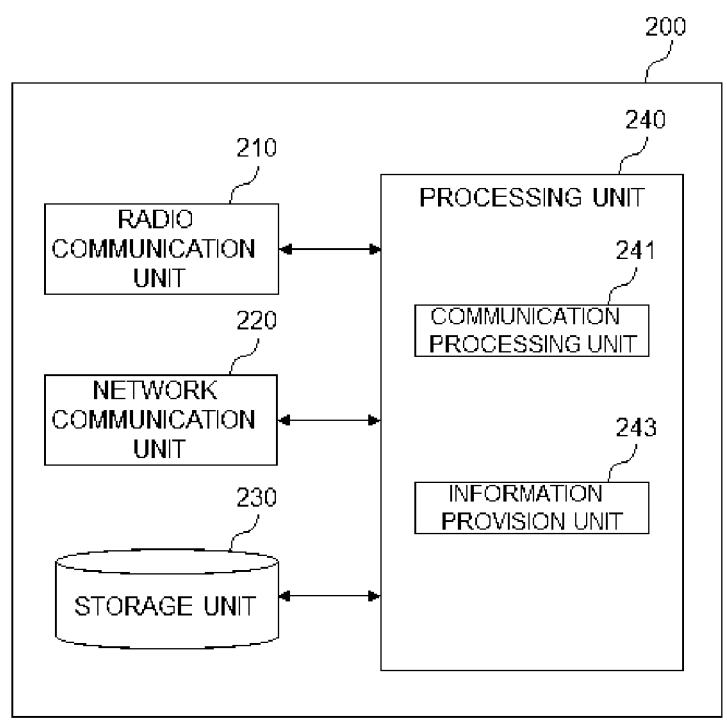
FIG. 3 is a block diagram illustrating an example of a schematic configuration of a base station according to the first exemplary embodiment.

Next, an example of a configuration of the base station 200 according to the first exemplary embodiment will be described with reference to FIG. 3. FIG. 3 is a block diagram illustrating an example of a schematic configuration of the base station 200 according to the first exemplary embodiment. Referring to FIG. 3, the base station 200 includes a radio communication unit 210, a network communication unit 220, a storage unit 230, and a processing unit 240.

The radio communication unit 210 wirelessly transmits and receives signals. For example, the radio communication unit 210 receives a signal from the terminal apparatus, and transmits a signal to the terminal apparatus.

The network communication unit 220 receives a signal from the network 51 and transmits a signal to the network 51.

The storage unit 230 transitorily or permanently stores programs and parameters for an operation of the base station 200, and various pieces of data.

The processing unit 240 provides various functions of the base station 200. The processing unit 240 includes a communication processing unit 241, and an information provision unit 243. Note that the processing unit 240 may further include other components than these components. In other words, the processing unit 240 may perform other operations than the operations of these components.

Concrete operations of the communication processing unit 241 and information provision unit 243 are described later in detail.

Note that the radio communication unit 210 may include an antenna, a radio frequency (RF) circuit, and the like. The network communication unit 220 may include a network adapter, a network interface card or the like. The storage unit 230 may include a memory (e.g., non-volatile memory and/or volatile memory) and/or a hard disk or the like. The processing unit 240 may include a baseband (BB) processor and/or other processors or the like.

<2.4. Configuration Example of Terminal Apparatus>

Figure 4:
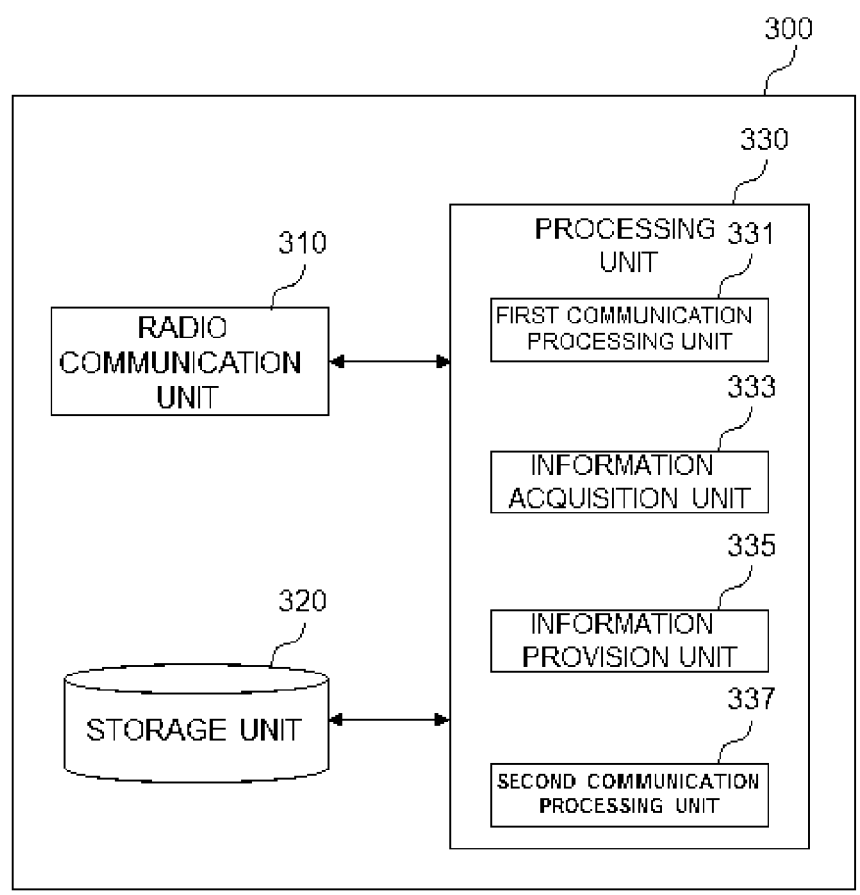
FIG. 4 is a block diagram illustrating an example of a schematic configuration of a terminal apparatus according to the first exemplary embodiment.

Next, an example of a configuration of the terminal apparatus 300 according to the first exemplary embodiment will be described with reference to FIG. 4. FIG. 4 is a block diagram illustrating an example of a schematic configuration of the terminal apparatus 300 according to the first exemplary embodiment. Referring to FIG. 4, the terminal apparatus 300 includes a radio communication unit 310, a storage unit 320, and a processing unit 330.

The radio communication unit 310 wirelessly transmits and receives a signal. For example, the radio communication unit 310 receives a signal from the base station, and transmits a signal to the base station.

The storage unit 320 transitorily or permanently stores programs and parameters for an operation of the terminal apparatus 300, and various pieces of data.

The processing unit 330 provides various functions of the terminal apparatus 300. The processing unit 330 includes a first communication processing unit 331, an information acquisition unit 333, an information provision unit 335, and a second communication processing unit 337. Note that the processing unit 330 may further include other components than these components. In other words, the processing unit 330 may perform other operations than the operations of these components.

Concrete operations of the first communication processing unit 331, information acquisition unit 333, information provision unit 335, and second communication processing unit 337 are described later in detail.

The radio communication unit 310 may include an antenna, a radio frequency (RF) circuit, and the like. The storage unit 320 may include a memory (e.g., non-volatile memory and/or volatile memory) and/or a hard disk or the like. The processing unit 330 may include a baseband (BB) processor and/or other processors or the like.

<2.5. Technical Features>

Next, technical features according to the first exemplary embodiment will be described with reference to FIG. 5 and FIG. 6.

(1) Transmission to Terminal Apparatus Via AP (a) Operation of Base Station 200

The base station 200 (communication processing unit 241) performs transmission processing in the PDCP layer of the base station 200. For example, the base station 200 (communication processing unit 241) generates a data unit of the PDCP layer. The data unit is a PDCP packet data unit (PDU) or PDCP packet, in other words.

For example, in a case that the base station 200 (information provision unit 243) transmits the data unit to the terminal apparatus 300 via the access point 40, the base station 200 provides the data unit to the gateway 100. Specifically, the base station 200 (information provision unit 243) transmits the data unit to the gateway 100.

Note that the base station 200 (communication processing unit 241) may generate another data unit of the PDCP layer to directly transmit the generated another data unit to the terminal apparatus 300. In this case, the base station 200 (communication processing unit 241) may perform transmission processing in the RLC layer and MAC layer.

(b) Operation of Gateway 100

The gateway 100 (information acquisition unit 131) acquires the data unit (i.e., the data unit from the PDCP layer of the base station 200). As described above, the data unit is a PDCP PDU or PDCP packet, in other words. Then, the gateway 100 (communication processing unit 135) transmits the data unit to the terminal apparatus 300 via the access point 40 using a protocol enabling delivery confirmation.

For example, the protocol is a protocol for a transport layer. As an example, the protocol is a transmission control protocol (TCP). In other words, the gateway 100 (communication processing unit 135) transmits the data unit to the terminal apparatus 300 via the access point 40 using the TCP. To be more specific, the gateway 100 (communication processing unit 135) generates a TCP packet including the data unit, and generates an internet protocol (IP) packet including the generated TCP packet to transmit the generated IP packet, for example. For example, an IP address used for transmission and reception of the data unit via the access point 40 (i.e., IP address of the gateway 100 and/or IP address of the terminal apparatus 300) is transmitted to the terminal apparatus 300 by the base station 200 (communication processing unit 241). For example, the IP address is provided to the base station 200 by the gateway 100 (information provision unit 133). For example, the gateway 100 transmits an AP Addition Request Acknowledge message including the IP address of the terminal apparatus 300 to the base station 200, and the base station 200 transmits an RRC Connection Reconfiguration message including the IP address of the terminal apparatus 300 to the terminal apparatus 300. The IP address of the terminal apparatus 300 may be assigned by the gateway 100. The IP address of the gateway 100 may also be transmitted to the base station 200 and terminal apparatus 300 in a way similar to the IP address of the terminal apparatus 300.

For example, the gateway 100 (communication processing unit 135) manages a correspondence relationship between a PDCP sequence number of the data packet and a sequence number of a packet of the protocol including the data packet (e.g., TCP packet).

This enables delivery confirmation for data transmitted from the base station 200 to the terminal apparatus 300 via the access point 40, for example. In addition, as a new function does not need to be added to the access point 40, the existing access point can be utilized.

Of course, the protocol is not limited to the TCP, and may be other protocol. As an example, the protocol may be a stream control transmission protocol (SCTP).

(2) Reception by Terminal Apparatus (a) Reception Via Access Point 40

The terminal apparatus 300 (second communication processing unit 337) receives the data unit using the protocol (e.g., TCP) (i.e., a data unit acquired from the PDCP layer of the base station 200 and transmitted to the terminal apparatus 300 via the access point 40 using the protocol). For example, the terminal apparatus 300 transmits an acknowledgement (ACK) to the gateway 100 in a case of normally completing the reception of the data unit, or transmits a negative acknowledgement (NACK) to the gateway 100 in a case of not normally completing the reception of the data unit. This allows the gateway 100 to actually make delivery confirmation for the data, for example.

(b) Reception Processing in PDCP Layer

Further, the terminal apparatus 300 (information acquisition unit 333) acquires the data unit. Then, the terminal apparatus 300 (first communication processing unit 331) performs the reception processing of the data unit in the terminal apparatus 300. For example, the terminal apparatus 300 (first communication processing unit 331) performs the reception processing of the data unit in the PDCP layer of the terminal apparatus 300.

For example, the reception processing includes re-ordering in the PDCP layer of the terminal apparatus 300. This makes it possible to process in a correct order the data unit transmitted from the base station 200 directly to the terminal apparatus 300 and the data unit transmitted from base station 200 to the terminal apparatus 300 via the access point 40, for example. Moreover, the reception processing includes, for example, removing a PDCP header, deciphering, and/or header decompression, or the like.

Note that the first communication processing unit 331 performs, in addition to the processing in the PDCP layer, processing in the RLC layer, MAC layer, physical layer and/or radio resource control (RRC) layer or the like (i.e., processing of direct transmission and reception to and from the base station 200), for example. The second communication processing unit 337 performs the processing in the layer of the protocol (e.g., TCP) and lower layers (i.e., processing of transmission and reception via the access point 40). The information acquisition unit 333 acquires information (e.g., the data unit) from the second communication processing unit 337 for the first communication processing unit 331, and the information provision unit 335 provides the information from the first communication processing unit 331 to the second communication processing unit 337.

(3) Result of Delivery Confirmation (a) Provision of Result of Delivery Confirmation For example, the gateway 100 (information provision unit 133) provides a result of delivery confirmation of the protocol (e.g., TCP) to the PDCP layer of the base station 200. For example, the result includes information indicating that delivery of the data unit is acknowledged (e.g., ACK). For example, the result includes information indicating that delivery of the data unit is not acknowledged (e.g., NACK).

This enables the PDCP layer of the base station 200 to operate as well as in the case that the RLC is used, even if the PDCP PDU is transmitted via the access point 40 (i.e., even if the RLC is not used to transmit the PDCP PDU), for example.

(b) Operation Based on Result of Delivery Confirmation

For example, the base station 200 (communication processing unit 241) advances a re-ordering window of the PDCP layer on the basis of the result of delivery confirmation of the protocol (e.g., TCP).

Specifically, when delivery of one or more pieces of data in front of the re-ordering window is acknowledged, the base station 200 (communication processing unit 241) advances the re-ordering window by the one or more data units, for example. The base station 200 (communication processing unit 241) also deletes the one or more data units from the buffer.

On the other hand, for example, when delivery of one or more pieces of data in front of the re-ordering window is not acknowledged in a certain time period, the base station 200 (communication processing unit 241) automatically advances the re-ordering window by the one or more data units. The base station 200 (communication processing unit 241) also deletes the one or more data units from the buffer.

This can prevent the data from being stagnated in the buffer, for example. Therefore, data transmission stagnation and data loss due to buffer overflow may be prevented. Throughput of the terminal apparatus 300 may also be improved.

(4) Example of Transmission and Reception

Figure 5:
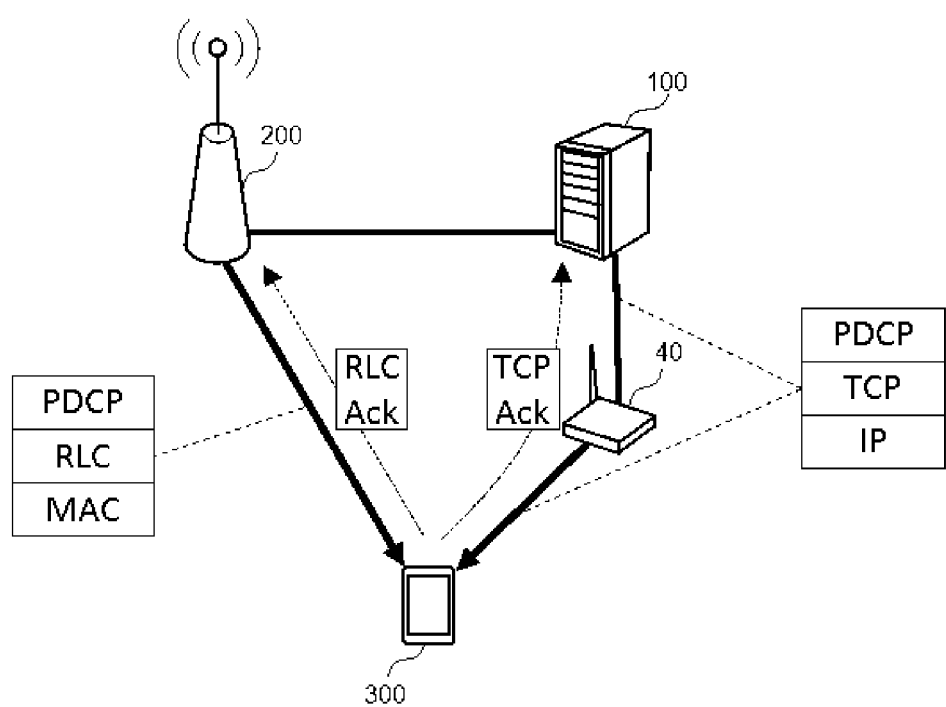
FIG. 5 is an explanatory diagram for describing an example of data transmission and reception in the first exemplary embodiment.

FIG. 5 is an explanatory diagram for describing an example of data transmission and reception in the first exemplary embodiment. Referring to FIG. 5, the gateway 100, the base station 200, the terminal apparatus 300, and the access point 40 are illustrated. For example, the base station 200 directly transmits the PDCP PDU of the base station 200 to the terminal apparatus 300 using the RLC, MAC, and the like. In addition, the gateway 100, for example, instead of the base station 200, transmits the PDCP PDU of the base station 200 to the terminal apparatus 300 via the access point 40 using the TCP, IP and the like.

(5) Flow of Processing (a) First Processing

Figure 6:
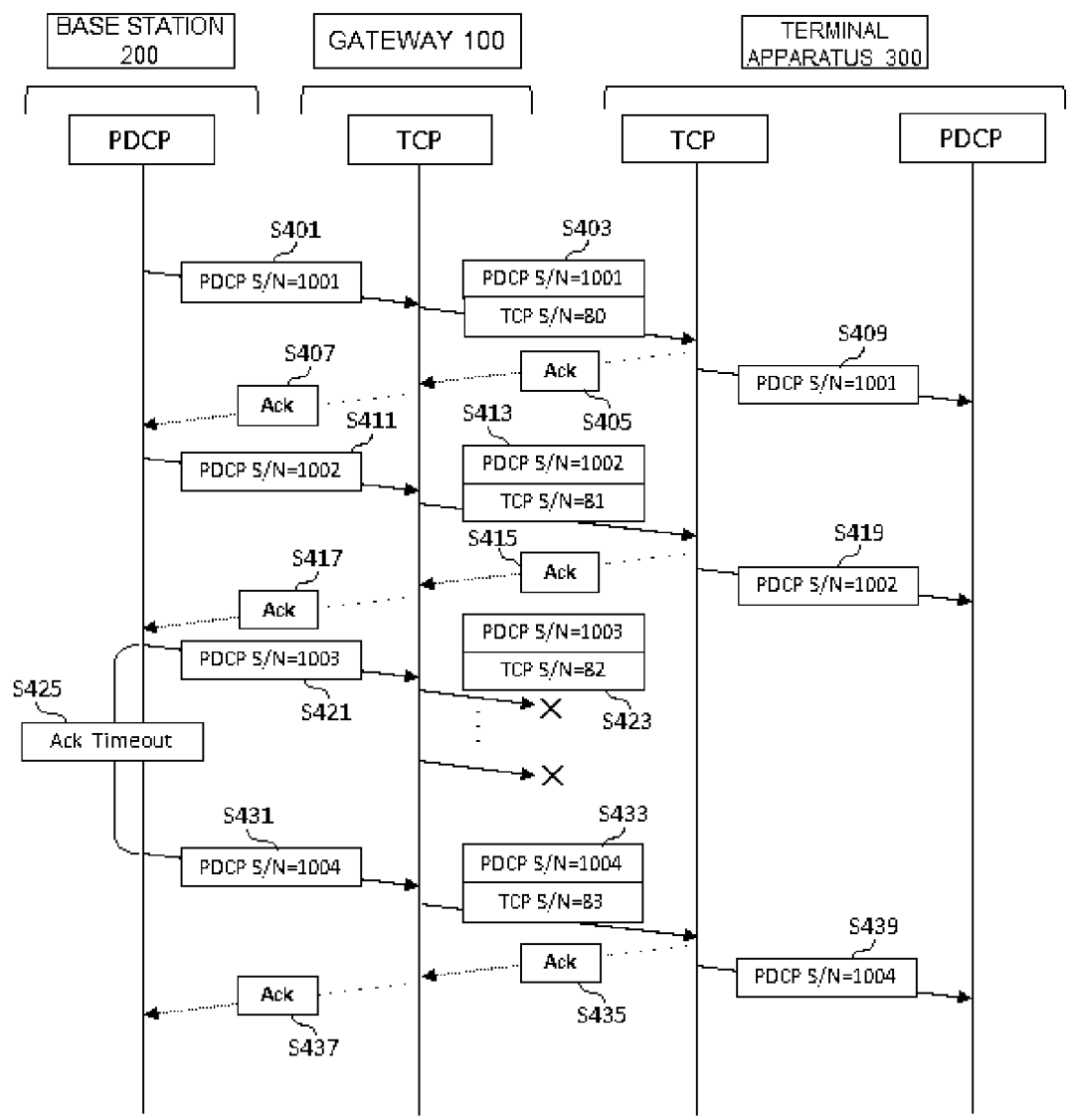
FIG. 6 is a sequence diagram illustrating an example of a schematic flow of first processing in the first exemplary embodiment.

FIG. 6 is a sequence diagram illustrating an example of a schematic flow of first processing in the first exemplary embodiment. The first processing is processing relating to data transmission and reception via the access point 40. Note that the access point 40 is not illustrated in FIG. 6, but the access point 40 is positioned between the gateway 100 and the terminal apparatus 300.

The base station 200 generates a PDCP packet (sequence number: 1001) and transmits the generated PDCP packet to the gateway 100 (S401). The gateway 100 generates a TCP packet (sequence number: 80) including the PDCP packet and transmits the generated TCP packet to the terminal apparatus 300 (via the access point 40) (S403). The terminal apparatus 300 receives the TCP packet (and the PDCP packet), normally completing this reception. Therefore, the terminal apparatus 300 transmits an ACK responsive to the TCP packet to the gateway 100 (S405), and further, the gateway 100 transmits an ACK responsive to the PDCP packet to the base station 200 (S407). For example, the base station 200 advances the re-ordering window. The terminal apparatus 300 acquires the PDCP packet included in the TCP packet for the sake of the PDCP layer (S409) to perform reception processing in the PDCP layer.

The base station 200 generates a PDCP packet (sequence number: 1002) and transmits the generated PDCP packet to the gateway 100 (S411). The gateway 100 generates a TCP packet (sequence number: 81) including the PDCP packet and transmits the generated TCP packet to the terminal apparatus 300 (via the access point 40) (S413). The terminal apparatus 300 receives the TCP packet (and the PDCP packet), normally completing this reception. Therefore, the terminal apparatus 300 transmits an ACK responsive to the TCP packet to the gateway 100 (S415), and further, the gateway 100 transmits an ACK responsive to the PDCP packet to the base station 200 (S417). For example, the base station 200 advances the re-ordering window. The terminal apparatus 300 acquires the PDCP packet included in the TCP packet for the sake of the PDCP (S419) to perform the reception processing in the PDCP layer.

The base station 200 generates a PDCP packet (sequence number: 1003) and transmits the generated PDCP packet to the gateway 100 (S421). The gateway 100 generates a TCP packet (sequence number: 82) including the PDCP packet and transmits the generated TCP packet to the terminal apparatus 300 (via the access point 40) (S423). However, reception of the TCP packet is not normally completed in the terminal apparatus 300, and timeout of the ACK is detected (S425). For example, also in this case, the base station 200 advances the re-ordering window.

The base station 200 generates a PDCP packet (sequence number: 1004) and transmits the generated PDCP packet to the gateway 100 (S431). The gateway 100 generates a TCP packet (sequence number: 83) including the PDCP packet and transmits the generated TCP packet to the terminal apparatus 300 (via the access point 40) (S433). The terminal apparatus 300 receives the TCP packet (and the PDCP packet), normally completing this reception. Therefore, the terminal apparatus 300 transmits an ACK responsive to the TCP packet to the gateway 100 (S435), and further, the gateway 100 transmits an ACK responsive to the PDCP packet to the base station 200 (S437). For example, the base station 200 advances the re-ordering window. The terminal apparatus 300 acquires the PDCP packet included in the TCP packet for the sake of the PDCP layer (S439) to perform the reception processing in the PDCP layer.

Hereinabove, an example of the schematic flow of processing in the first exemplary embodiment is described. Note that in the example described above, after the transmission and reception, and delivery confirmation for one PDCP packet, the transmission and reception, and delivery confirmation for another PDCP packet is performed, but the processing in the first exemplary embodiment is not limited to this example. Of course, transmission and reception, and delivery confirmation for multiple PDCP packets may be performed in parallel. Furthermore, in the example described above, the gateway 100 does not retransmit the TCP packet (sequence number: 82), but the processing in the first exemplary embodiment is not limited to this example. Of course, the gateway 100 may retransmit the TCP packet (sequence number: 82).

(b) Second Processing

Figure 7:
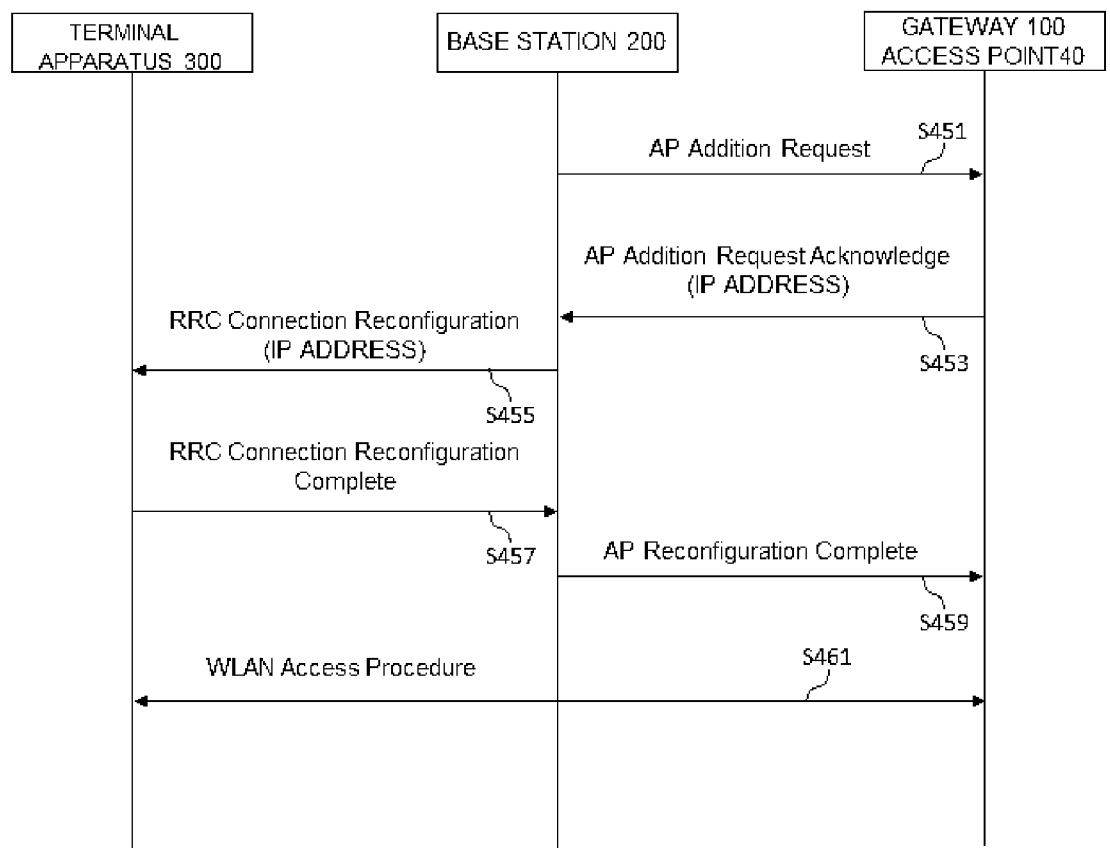
FIG. 7 is a sequence diagram illustrating an example of a schematic flow of second processing in the first exemplary embodiment.

FIG. 7 is a sequence diagram illustrating an example of a schematic flow of second processing in the first exemplary embodiment. The second processing is processing relating to IP address transmission to the terminal apparatus 300.

The base station 200 transmits an AP Addition Request message to the gateway 100 (S451). Then, the gateway 100 transmits an AP Addition Request Acknowledge message including the IP address of the terminal apparatus 300 to the base station 200 (S453).

Further, the base station 200 transmits an RRC Connection Reconfiguration message including the IP address of the terminal apparatus 300 to the terminal apparatus 300 (S455). Then, the terminal apparatus 300 transmits an RRC Connection Reconfiguration Complete message to the base station 200 (S457).

The base station 200 transmits an AP Reconfiguration Complete message to the gateway 100 (S459).

The terminal apparatus 300 and the access point 40 perform a WLAN access procedure (S461).

Hereinabove, an example of the schematic flow of the second processing is described, but the second processing is not limited to this example. For example, the gateway 100 may transmit the IP address of the gateway 100, in addition to the IP address of the terminal apparatus 300, to the base station 200. The base station 200 may transmit the IP address of the gateway 100, in addition to the IP address of the terminal apparatus 300, to the terminal apparatus 300.

(6) Others (a) Status Report

The terminal apparatus 300 (first communication processing unit 331) may transmit to the base station 200 a PDCP status report indicating that the data unit (i.e., the data unit transmitted to the terminal apparatus 300 via the access point 40 using the protocol (e.g., TCP)) is received. The terminal apparatus 300 (first communication processing unit 331) may directly transmit the PDCP status report to the base station 200. The transmission of the PDCP status report may be performed regardless of whether handover is performed or not. This enables the base station 200 to further surely make delivery confirmation for the data unit, for example.

(b) Congestion Control

The base station 200 (communication processing unit 241) may perform control of congestion between the base station 200 and the terminal apparatus 300 on the basis of information from the protocol (e.g., TCP). For example, this control may include adjusting an amount of data directly transmitted from the base station 200 to the terminal apparatus 300 and an amount of data transmitted from the base station 200 to the terminal apparatus 300 via the access point 40. Note that the information from the protocol may be provided to the base station 200 by the gateway 100.

Specifically, the base station 200 (communication processing unit 241) may detect congestion on a direct data path from the base station 200 to the terminal apparatus 300 and/or congestion on a data path via the access point 40. Then, the base station 200 (communication processing unit 241) may adjust amounts of data transmitted between these data paths. For example, when the base station 200 (communication processing unit 241) detects the congestion on the direct data path, the base station 200 may decrease the amount of data transmitted on the direct data path and increase the amount of data transmitted on the data path via the access point 40. On the other hand, when the base station 200 (communication processing unit 241) detects the congestion on the data path via the access point 40, the base station 200 may decrease the amount of data transmitted on the data path via the access point 40 and increase the amount of data transmitted on the direct data path.

As an example, the base station 200 (communication processing unit 241) may detect the congestion on the data path via the access point 40 on the basis of the result of delivery confirmation of the protocol (e.g., TCP). As another example, the base station 200 (communication processing unit 241) may detect the congestion on the data path via the access point 40 on the basis of whether or not slow start is performed in the protocol. As still another example, the base station 200 (communication processing unit 241) may detect the congestion on the data path via the access point 40 based on buffer usage information indicated in the ACK transmitted by the terminal apparatus 300. As still another example, the base station 200 (communication processing unit 241) may support a simple network management protocol (SNMP) protocol to detect the congestion on the data path via the access point 40 on the basis of management information base (MIB) information.

The congestion control like this may allow the throughput of the terminal apparatus 300 to be improved.

Hereinabove, the example in the first exemplary embodiment is described. Note that the example described above is an example in downlink data transmission, but uplink data transmission may be similarly performed in the first exemplary embodiment. For example, the information acquisition unit 333, information provision unit 335, and second communication processing unit 337 in the terminal apparatus 300 may perform the processing similar to the above-described processing respectively of the information acquisition unit 131, information provision unit 133, and communication processing unit 135 in the gateway 100, and the first communication processing unit 331 in the terminal apparatus 300 may perform the processing similar to the above-described processing of the communication processing unit 241 in the base station 200. In contrast, the information acquisition unit 131, information provision unit 133, and communication processing unit 135 in the gateway 100 may perform the processing similar to the above-described processing respectively of the information acquisition unit 333, information provision unit 335, and second communication processing unit 337 in the terminal apparatus 300, and the communication processing unit 241 in the base station 200 may perform the processing similar to the above-described processing of the first communication processing unit 331 in the terminal apparatus 300.

3. Second Exemplary Embodiment

Next, a second exemplary embodiment of the present invention will be described with reference to FIG. 8 to FIG. 13.

In the first exemplary embodiment, the gateway 100 and the base station 200 are employed, but in the second exemplary embodiment, the gateway 100 may not be employed and the functions of the gateway 100 is implemented in the base station 200.

<3.1. Configuration Example of System>

Figure 8:
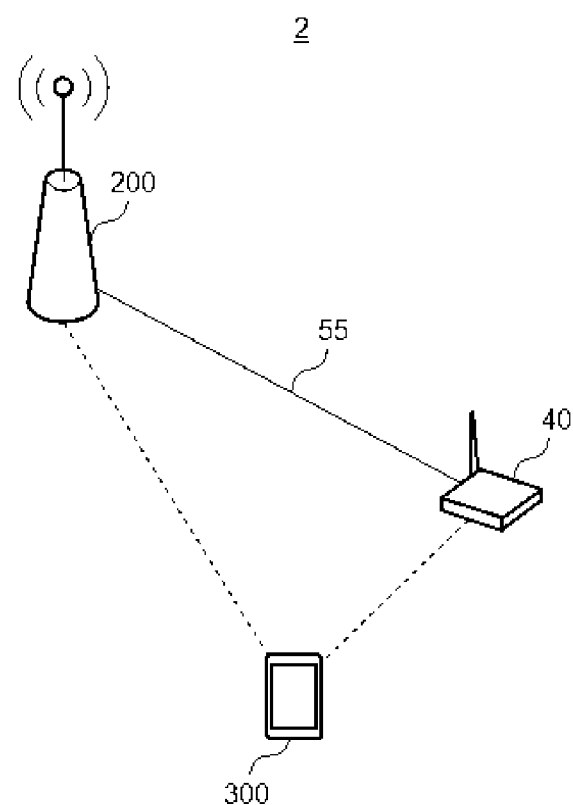
FIG. 8 is an explanatory diagram illustrating an example of a schematic configuration of a system according to a second exemplary embodiment.

First, an example of a configuration of a system 2 according to the second exemplary embodiment will be described with reference to FIG. 8. FIG. 8 is an explanatory diagram illustrating an example of a schematic configuration of the system 2 according to the second exemplary embodiment. Referring to FIG. 8, the system 2 includes the base station 200, the terminal apparatus 300 and the access point 40. The base station 200 and the access point 40 transmit and receive signals via a network 55.

The description of the base station 200, access point 40, and terminal apparatus 300 is not specifically different between the first exemplary embodiment and the second exemplary embodiment. Therefore, a duplicated description is omitted here.

<3.2. Configuration Example of Base Station>

Figure 9:
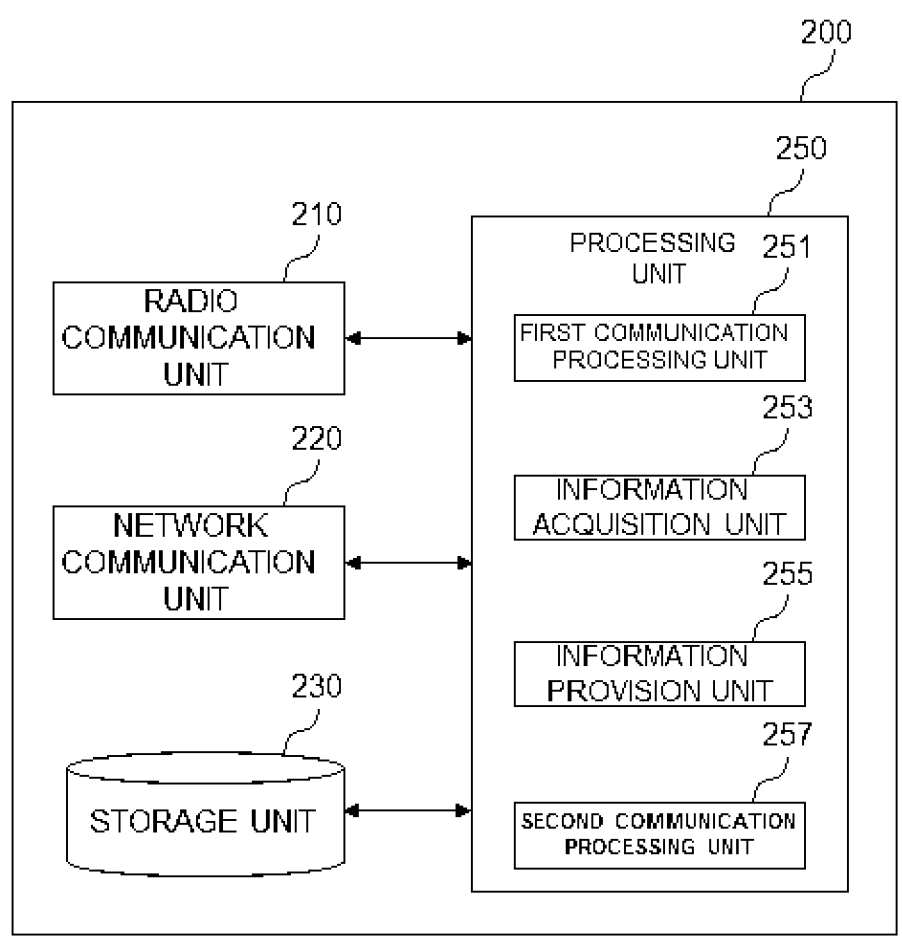
FIG. 9 is a block diagram illustrating an example of a schematic configuration of a base station according to the second exemplary embodiment.

Next, an example of a configuration of the base station 200 according to the second exemplary embodiment will be described with reference to FIG. 9. FIG. 9 is a block diagram illustrating an example of a schematic configuration of the base station 200 according to the second exemplary embodiment. Referring to FIG. 9, the base station 200 includes the radio communication unit 210, the network communication unit 220, the storage unit 230, and a processing unit 250.

The description of the radio communication unit 210, network communication unit 220, and storage unit 230 is not specifically different between the first exemplary embodiment and the second exemplary embodiment. Therefore, a duplicated description is omitted here.

The processing unit 250 provides various functions of the base station 200. The processing unit 250 includes a first communication processing unit 251, an information acquisition unit 253, an information provision unit 255, and a second communication processing unit 257. Note that the processing unit 250 may further include other components than these components. In other words, the processing unit 250 may perform other operations than the operations of these components.

Concrete operations of the first communication processing unit 251, information acquisition unit 253, information provision unit 255, and second communication processing unit 257 are described later. Note that the first communication processing unit 251 in the second exemplary embodiment corresponds to the communication processing unit 241 in the base station 200 in the first exemplary embodiment. In addition, the information acquisition unit 253, information provision unit 255, and second communication processing unit 257 in the second exemplary embodiment correspond to the information acquisition unit 131, information provision unit 133, and communication processing unit 135 in the gateway 100 in the first exemplary embodiment, respectively.

Note that the processing unit 250 may include a baseband (BB) processor and/or other processors or the like.

<3.3. Configuration Example of Terminal Apparatus>

Figure 10:
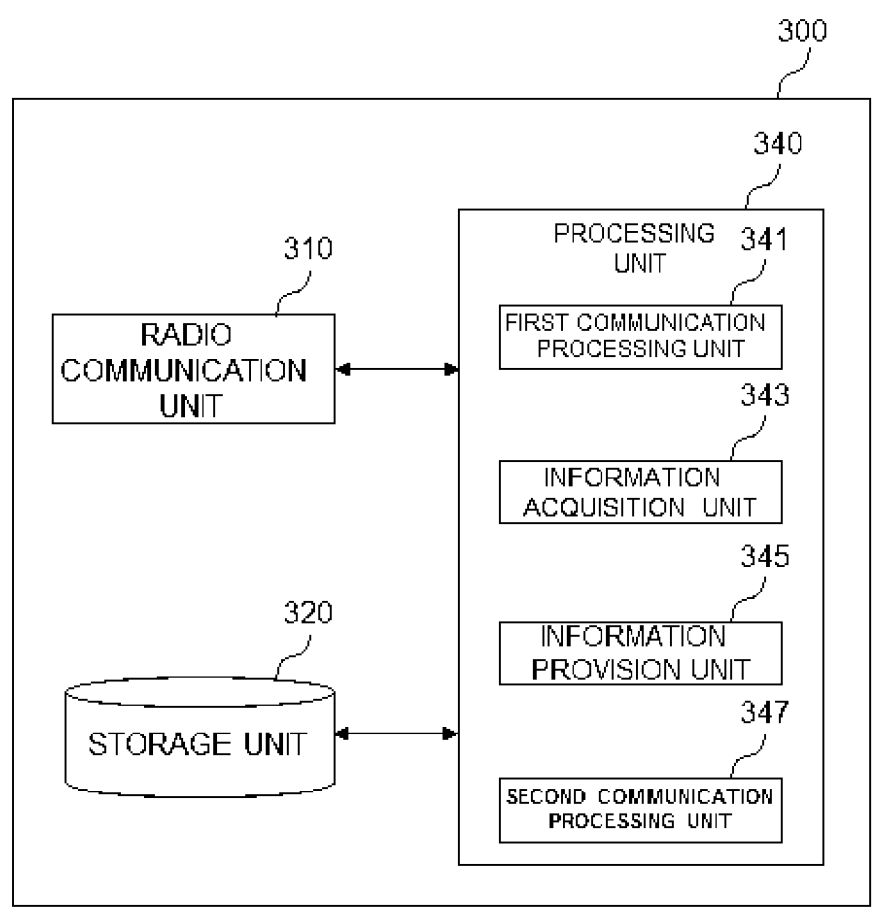
FIG. 10 is a block diagram illustrating an example of a schematic configuration of a terminal apparatus according to the second exemplary embodiment.

Next, an example of a configuration of the terminal apparatus 300 according to the second exemplary embodiment will be described with reference to FIG. 10. FIG. 10 is a block diagram illustrating an example of a schematic configuration of the terminal apparatus 300 according to the second exemplary embodiment. Referring to FIG. 10, the terminal apparatus 300 includes the radio communication unit 310, the storage unit 320, and a processing unit 340.

The description of the radio communication unit 310 and storage unit 320 is not specifically different between the first exemplary embodiment and the second exemplary embodiment. Therefore, a duplicated description is omitted here.

The processing unit 340 provides various functions of the terminal apparatus 300. The processing unit 340 includes a first communication processing unit 341, an information acquisition unit 343, an information provision unit 345, and a second communication processing unit 347. Note that the processing unit 340 may further include other components than these components. In other words, the processing unit 340 may perform other operations than the operations of these components.

Concrete operations of the first communication processing unit 341, information acquisition unit 343, information provision unit 345, and second communication processing unit 347 are described later. Note that the first communication processing unit 341, information acquisition unit 343, information provision unit 345, and second communication processing unit 347 in the second exemplary embodiment correspond to the first communication processing unit 331, information acquisition unit 333, information provision unit 335, and second communication processing unit 337 in the first exemplary embodiment, respectively.

The processing unit 340 may include a baseband (BB) processor and/or other processors or the like.

<3.4. Technical Features>

Next, technical features according to the second exemplary embodiment will be described with reference to FIG. 11 to FIG. 13.

(1) Transmission to Terminal Apparatus Via AP

The base station 200 (first communication processing unit 251) performs transmission processing in the PDCP layer of the base station 200. For example, the base station 200 (first communication processing unit 251) generates a data unit of the PDCP layer.

In addition, the base station 200 (information acquisition unit 253) acquires the data unit (i.e., the data unit from the PDCP layer of the base station 200). Then, the base station 200 (second communication processing unit 257) transmits the data unit to the terminal apparatus 300 via the access point 40 using a protocol enabling delivery confirmation.

The description of the above points is not specifically different between the first exemplary embodiment and the second exemplary embodiment except that operating subjects are different (i.e., the operating subject in the first exemplary embodiment is both the gateway 100 and the base station 200, but the operating subject in the second exemplary embodiment is the base station 200 only). Therefore, a duplicated description is omitted here. Note that the IP address used for transmission and reception of the data unit via the access point 40 (i.e., IP address of the base station 200 and/or IP address of the terminal apparatus 300) is transmitted to the terminal apparatus 300 by the base station 200 (first communication processing unit 251), for example. At this time, the IP address of the terminal apparatus 300 is transmitted using an RRC Connection Setup message or RRC Connection Reconfiguration message, for example. In other words, the base station 200 (first communication processing unit 251) transmits the RRC Connection Setup message or RRC Connection Reconfiguration message including the IP address of the terminal apparatus 300 to the terminal apparatus 300. The IP address of the terminal apparatus 300 may be assigned by the base station 200. The IP address of the base station 200 may also be transmitted to the terminal apparatus 300 in a way similar to the IP address of the terminal apparatus 300.

(2) Reception by Terminal Apparatus

The terminal apparatus 300 (second communication processing unit 347) receives the data unit using the protocol (e.g., TCP) (i.e., a data unit acquired from the PDCP layer of the base station 200 and transmitted to the terminal apparatus 300 via the access point 40 using the protocol).

Further, the terminal apparatus 300 (information acquisition unit 343) acquires the data unit. Then, the terminal apparatus 300 (first communication processing unit 341) performs reception processing of the data unit in the terminal apparatus 300. For example, the terminal apparatus 300 (first communication processing unit 341) performs the reception processing of the data unit in the PDCP layer of the terminal apparatus 300.

The description of the above points is not specifically different between the first exemplary embodiment and the second exemplary embodiment except for reference signs of the components in the terminal apparatus 300. Therefore, a duplicated description is omitted here.

(3) Result of Delivery Confirmation

For example, the base station 200 (information provision unit 255) provides a result of delivery confirmation of the protocol (e.g., TCP) to the PDCP layer of the base station 200.

For example, the base station 200 (first communication processing unit 251) advances a re-ordering window of the above PDCP layer on the basis of the result of delivery confirmation of the protocol (e.g., TCP).

The description of the above points is not specifically different between the first exemplary embodiment and the second exemplary embodiment except that operating subjects are different (i.e., the operating subject in the first exemplary embodiment is both the gateway 100 and the base station 200, but the operating subject in the second exemplary embodiment is the base station 200 only). Therefore, a duplicated description is omitted here.

(4) Example of Transmission and Reception

Figure 11:
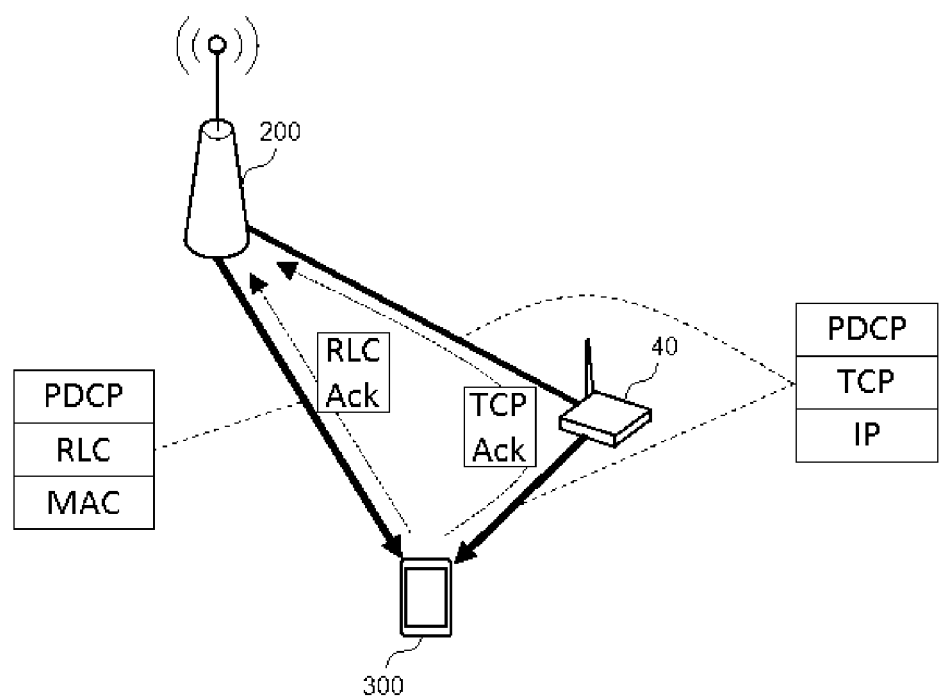
FIG. 11 is an explanatory diagram for describing an example of data transmission and reception in the second exemplary embodiment.

FIG. 11 is an explanatory diagram for describing an example of data transmission and reception in the second exemplary embodiment. Referring to FIG. 11, the base station 200, the terminal apparatus 300, and the access point 40 are illustrated. For example, the base station 200 directly transmits the PDCP PDU of the base station 200 to the terminal apparatus 300 using the RLC, MAC, and the like. In addition, for example, the base station 200 transmits the PDCP PDU of the base station 200 to the terminal apparatus 300 via the access point 40 using the TCP, IP and the like.

(5) Flow of Processing (a) First Processing

Figure 12:
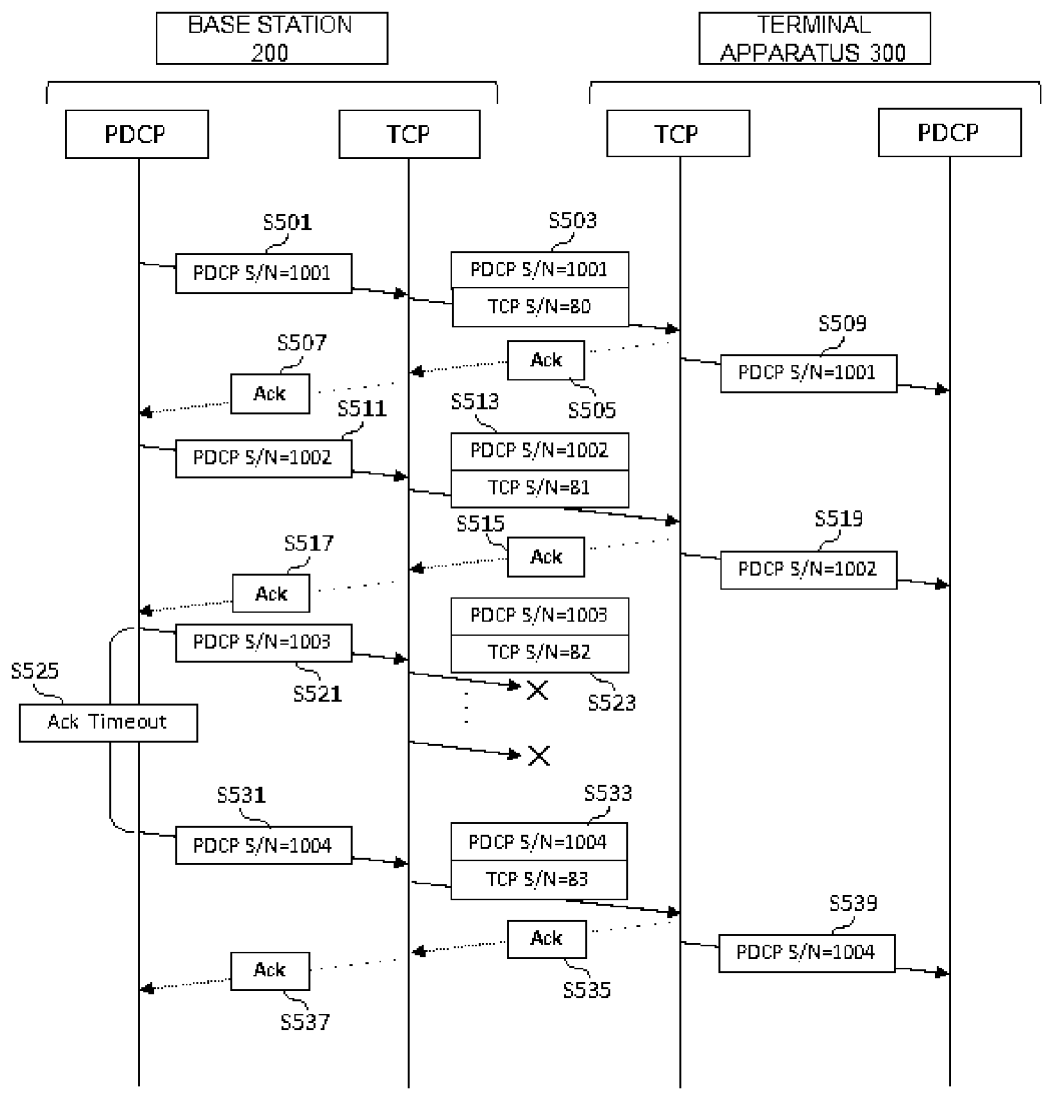
FIG. 12 is a sequence diagram illustrating an example of a schematic flow of first processing in the second exemplary embodiment.

FIG. 12 is a sequence diagram illustrating an example of a schematic flow of first processing in the second exemplary embodiment. The first processing is processing relating to data transmission and reception via the access point 40. Note that the access point 40 is not illustrated in FIG. 12, but the access point 40 is positioned between the base station 200 and the terminal apparatus 300.

The description of the example of the schematic flow of the first processing is not specifically different between the first exemplary embodiment and the second exemplary embodiment except that operating subjects are different (i.e., both the gateway 100 and the base station 200 exist on the transmission side in the first exemplary embodiment, but the base station 200 only exists on the transmission side in the second exemplary embodiment) and that reference signs are different. Therefore, a duplicated description is omitted here.

(b) Second Processing

Figure 13:
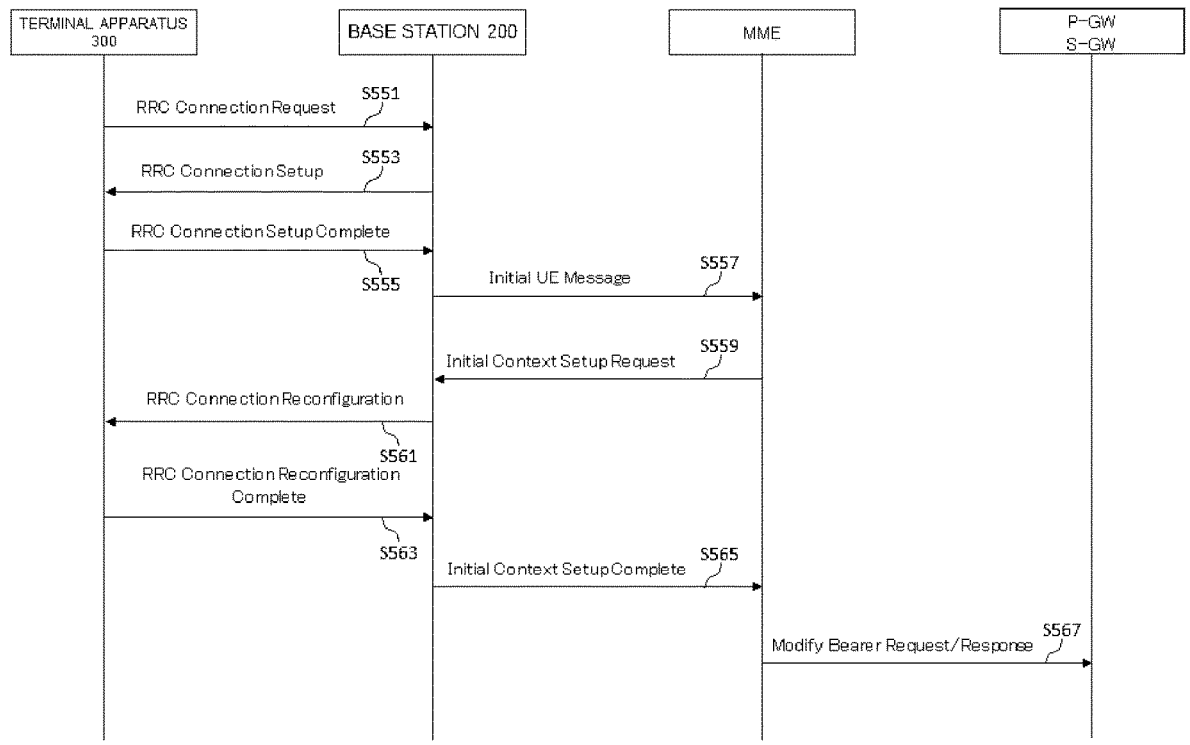
FIG. 13 is a sequence diagram illustrating an example of a schematic flow of second processing in the second exemplary embodiment.

FIG. 13 is a sequence diagram illustrating an example of a schematic flow of second processing in the second exemplary embodiment. The second processing is processing relating to IP address transmission to the terminal apparatus 300 (concretely, call setup flow processing, for example).

The terminal apparatus 300 transmits an RRC Connection Request message to the base station 200 (S551). Then, the base station 200 transmits an RRC Connection Setup message including the IP address of the terminal apparatus 300 to the terminal apparatus 300 (S553). Then, the terminal apparatus 300 transmits an RRC Connection Setup Complete message to the base station 200 (S555).

The base station 200 transmits an Initial UE Message to the MME (S557), and the MME transmits an Initial Context Setup Request message to the base station 200 (S559).

The base station 200 transmits an RRC Connection Reconfiguration message to the terminal apparatus 300 (S561). Then, the terminal apparatus 300 transmits an RRC Connection Reconfiguration Complete message to the base station 200 (S563).

The base station 200 transmits an Initial Context Setup Complete message to the MME (S565). Then, the MME, serving gateway (S-GW), and packet data network gateway (P-GW) transmit and receive a Modify Bearer Request message and Modify Bearer Response message (S567).

Hereinabove, an example of the schematic flow of the second processing is described, but the second processing is not limited to this example.

For example, the base station 200 may, at step S561, transmit an RRC Connection Reconfiguration message including the IP address of the terminal apparatus 300 to the terminal apparatus 300, instead of transmitting (or together with transmitting) the RRC Connection Setup message including the IP address of the terminal apparatus 300.

For example, the base station 200 may transmit also the IP address of the base station 200 in addition to the IP address of the terminal apparatus 300.

(6) Others

The description of the PDCP status report and congestion control also is not specifically different between the first exemplary embodiment and the second exemplary embodiment. Therefore, a duplicated description is omitted here.

Hereinabove, the second exemplary embodiment is described. Note that the example described above is an example in downlink data transmission, but uplink data transmission may be similarly performed in the second exemplary embodiment. For example, the first communication processing unit 341, information acquisition unit 343, information provision unit 345, and second communication processing unit 347 in the terminal apparatus 300 may perform the processing similar to the above-described processing respectively of the first communication processing unit 251, information acquisition unit 253, information provision unit 255, and second communication processing unit 257 in the base station 200. In contrast, the first communication processing unit 251, information acquisition unit 253, information provision unit 255, and second communication processing unit 257 in the base station 200 may perform the processing similar to the above-described processing respectively of the first communication processing unit 341, information acquisition unit 343, information provision unit 345, and second communication processing unit 347 in the terminal apparatus 300.

4. Third Exemplary Embodiment

Figure 14:
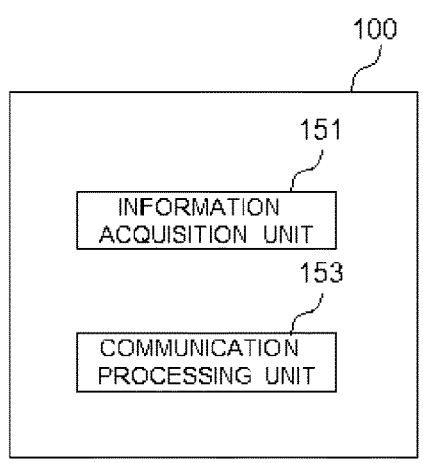
FIG. 14 is a block diagram illustrating an example of a schematic configuration of a gateway according to a third exemplary embodiment.
Figure 15:
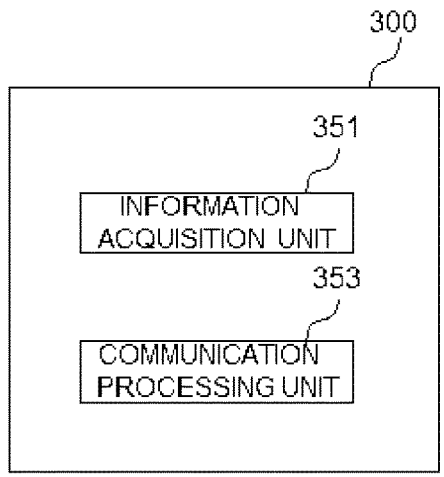
FIG. 15 is a block diagram illustrating an example of a schematic configuration of a terminal apparatus according to the third exemplary embodiment.

Next, a third exemplary embodiment of the present invention will be described with reference to FIG. 14 to FIG. 16.

<4.1. Configuration Example of System>

A description of an example of a configuration of a system according to the third exemplary embodiment is the same as the description of an example of the configuration of the system according to the first exemplary embodiment, for example. Therefore, a duplicated description is omitted here.

<4.2. Configuration Example of Gateway>

Next, an example of a configuration of the gateway 100 according to the third exemplary embodiment will be described with reference to FIG. 14. FIG. 14 is a block diagram illustrating an example of a schematic configuration of the gateway 100 according to the third exemplary embodiment. Referring to FIG. 14, the gateway 100 includes an information acquisition unit 151 and a communication processing unit 153.

Concrete operations of the information acquisition unit 151 and communication processing unit 153 are described later.

The information acquisition unit 151 and the communication processing unit 153 may be implemented in a processor or the like.

<4.3. Configuration Example of Terminal Apparatus>

Next, an example of a configuration of the terminal apparatus 300 according to the third exemplary embodiment will be described with reference to FIG. 15. FIG. 15 is a block diagram illustrating an example of a schematic configuration of the terminal apparatus 300 according to the third exemplary embodiment. Referring to FIG. 15, the terminal apparatus 300 includes an information acquisition unit 351 and a communication processing unit 353.

Concrete operations of the information acquisition unit 351 and communication processing unit 353 are described later.

The information acquisition unit 351 and the communication processing unit 353 may be implemented in a baseband (BB) processor and/or other processors or the like.

<<4.4. Technical Features>>

Next, technical features according to the third exemplary embodiment will be described with reference to FIG. 16.

(1) Transmission to Terminal Apparatus Via AP

The gateway 100 (information acquisition unit 151) acquires a data unit from the PDCP layer of the base station 200. Then, the gateway 100 (communication processing unit 153) transmits the data unit to the terminal apparatus 300 via the access point 40 using a protocol enabling delivery confirmation.

The description of the above points is the same as the description of the first exemplary embodiment except for reference signs of the components in the gateway 100, for example. Therefore, a duplicated description is omitted here.

(2) Reception by Terminal Apparatus

The terminal apparatus 300 (information acquisition unit 333) acquires the data unit (i.e., data unit acquired from the PDCP layer of the base station 200 and transmitted to the terminal apparatus 300 via the access point 40 using the protocol). Then, the terminal apparatus 300 (first communication processing unit 331) performs reception processing of the data unit in the terminal apparatus 300.

The description of the above points is the same as the description of the first exemplary embodiment except for reference signs of the components in the terminal apparatus 300, for example. Therefore, a duplicated description is omitted here.

(3) Flow of Processing

Figure 16:
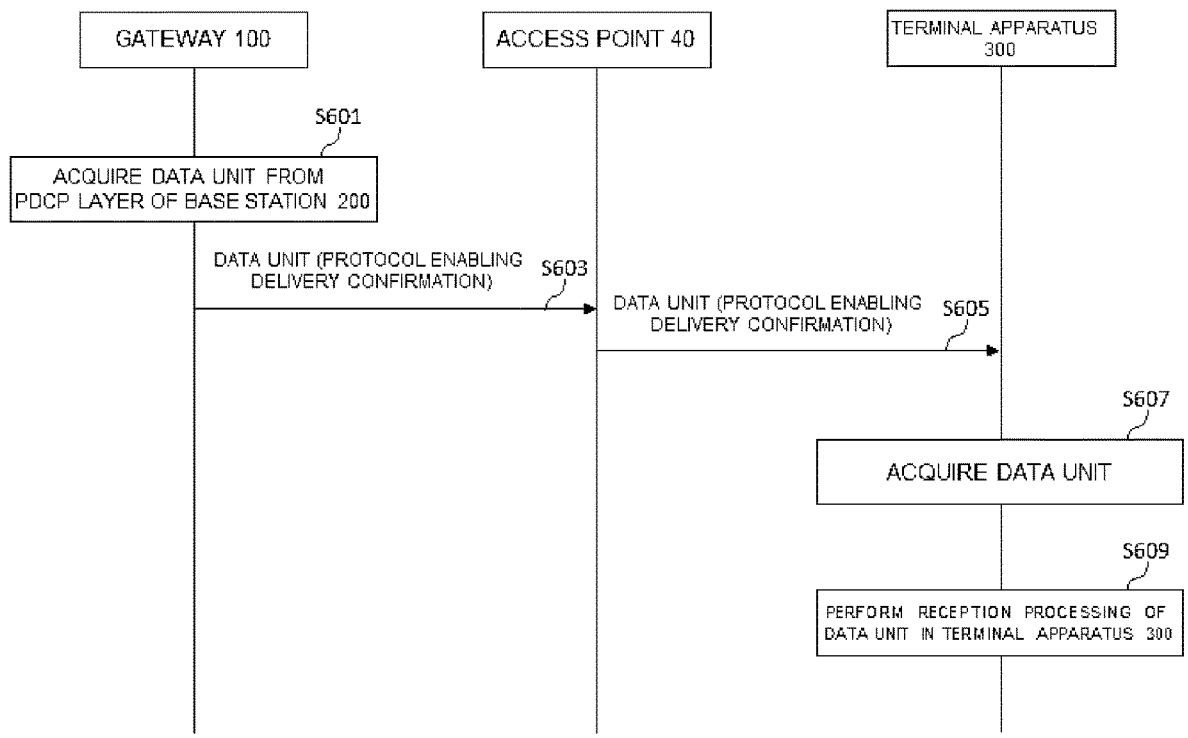
FIG. 16 is a sequence diagram illustrating an example of a schematic flow of processing in the third exemplary embodiment.

FIG. 16 is a sequence diagram illustrating an example of a schematic flow of processing in the third exemplary embodiment.

The gateway 100 acquires a data unit from the PDCP layer of the base station 200 (S601). Then, the gateway 100 transmits the data unit to the terminal apparatus 300 via the access point 40 using a protocol enabling delivery confirmation (S603, S605).

The terminal apparatus 300 acquires the data unit (S607). Then, the terminal apparatus 300 performs reception processing of the data unit in the terminal apparatus 300 (S609).

Hereinabove, the exemplary embodiments of the present invention are described. The present invention is not limited to the exemplary embodiments described above, and can be variously modified and embodied within a scope of a gist of the present invention. It should be appreciated by those skilled in the art that the exemplary embodiments described above are merely examples, and various modification examples may be made to a combination of the exemplary embodiments and a combination of components or processing processes thereof and such modification examples are also within the scope of the present invention.

For example, each of the "PDCP", "PDCP layer", and "PDCP sublayer" may be replaced with other expression of the "PDCP", "PDCP layer", and "PDCP sublayer".

For example, the steps in the processing described herein may not be necessarily performed in the order described in a sequence diagram in time series. For example, the step in the processing may be performed in an order different from or in parallel with the order described in the sequence diagram.

There may be provided a module including the components in the gateway described herein (e.g., information acquisition unit, information provision unit and/or communication processing unit). There may be provided a base station apparatus (e.g., an apparatus including a base band unit (BBU) or a BBU) including the components in the base station described herein (e.g., first communication processing unit, information acquisition unit, information provision unit and/or second communication processing unit, or communication processing unit and/or information provision unit), or a module of the base station apparatus (e.g., a BBU or a module of the BBU). There may be provided a module including the components in the terminal apparatus described herein (e.g., first communication processing unit, information acquisition unit, information provision unit and/ or second communication processing unit). There may be provided a method including those for processing of such components, and a program causing the processor to execute a processing of such components. There may be provided a recording medium storing the program. Needless to say, such base station apparatus, module, method, program, and recording medium are covered by the present invention.

Some or all of the exemplary embodiments above may be described also as the following supplementary notes, but are not limited thereto.

(Supplementary Note 1)

An apparatus including:

an information acquisition unit configured to acquire a data unit from a Packet Data Convergence Protocol (PDCP) layer of a base station; and a communication processing unit configured to transmit the data unit to a terminal apparatus via an access point of a wireless local area network, using a protocol enabling delivery confirmation.

(Supplementary Note 2)

The apparatus according to Supplementary Note 1, further including an information provision unit configured to provide a result of delivery confirmation of the protocol to the PDCP layer of the base station.

(Supplementary Note 3)

The apparatus according to Supplementary Note 2, wherein the result of delivery confirmation of the protocol includes information indicating that delivery of the data unit is acknowledged.

(Supplementary Note 4)

The apparatus according to Supplementary Note 2 or 3, wherein the result of delivery confirmation of the protocol includes information indicating that delivery of the data unit is not acknowledged.

(Supplementary Note 5)

The apparatus according to any one of Supplementary Notes 1 to 4, wherein the apparatus is a gateway different from the base station, or a module for the gateway.

(Supplementary Note 6)

The apparatus according to any one of Supplementary Notes 1 to 4, wherein the apparatus is the base station, a base station apparatus for the base station, or a module for the base station apparatus.

(Supplementary Note 7)

The apparatus according to Supplementary Note 6, further including:

another communication processing unit configured to perform transmission processing in the PDCP layer, wherein the other communication processing unit is configured to advance a re-ordering window of the PDCP layer based on the result of delivery confirmation of the protocol.

(Supplementary Note 8)

The apparatus according to Supplementary Note 6 or 7, further including:

another communication processing unit configured to perform transmission processing in the PDCP layer, wherein the other communication processing unit is configured to perform control of congestion between the base station and the terminal apparatus based on information from the protocol.

(Supplementary Note 9)

The apparatus according to Supplementary Note 8, wherein the control includes adjusting an amount of data directly transmitted from the base station to the terminal apparatus and an amount of data transmitted from the base station to the terminal apparatus via the access point.

(Supplementary Note 10)

An apparatus including:

an information acquisition unit configured to acquire a data unit from a PDCP layer of a base station, the data unit being transmitted to a terminal apparatus via an access point of a wireless local area network, using a protocol enabling delivery confirmation; and a communication processing unit configured to perform reception processing of the data unit in the terminal apparatus.

(Supplementary Note 11)

The apparatus according to Supplementary Note 10, further including another communication processing unit configured to receive the data unit using the protocol.

(Supplementary Note 12)

The apparatus according to Supplementary Note 10 or 11, wherein the reception processing includes re-ordering in the PDCP layer.

(Supplementary Note 13)

The apparatus according to any one of Supplementary Notes 10 to 12, wherein the communication processing unit is configured to transmit, to the base station, a PDCP status report indicating that the data unit is received.

(Supplementary Note 14)

The apparatus according to any one of Supplementary Notes 10 to 13, wherein the apparatus is the terminal apparatus, or a module for the terminal apparatus.

(Supplementary Note 15)

The apparatus according to any one of Supplementary Notes 1 to 14, wherein the protocol is a protocol for a transport layer.

(Supplementary Note 16)

The apparatus according to Supplementary Note 15, wherein the protocol is a Transmission Control Protocol (TCP) or a Stream Control Transmission Protocol (SCTP).

(Supplementary Note 17)

A method including:

acquiring a data unit from a PDCP layer of a base station; and transmitting the data unit to a terminal apparatus via an access point of a wireless local area network, using a protocol enabling delivery confirmation.

(Supplementary Note 18)

A method including:

acquiring a data unit from a PDCP layer of a base station, the data unit being transmitted to a terminal apparatus via an access point of a wireless local area network using a protocol enabling delivery confirmation; and performing reception processing of the data unit in the terminal apparatus.

(Supplementary Note 19)

A system including:

a gateway or a base station configured to transmit a data unit from a PDCP layer of the base station to a terminal apparatus via an access point of a wireless local area network, using a protocol enabling delivery confirmation; and the terminal apparatus configured to perform reception processing of the data unit in the terminal apparatus.

(Supplementary Note 20)

A method including:

transmitting, in a gateway or a base station, a data unit from a PDCP layer of the base station to a terminal apparatus via an access point of a wireless local area network, using a protocol enabling delivery confirmation; and performing, in the terminal apparatus, reception processing of the data unit in the terminal apparatus.

(Supplementary Note 21)

A program causing a processor to execute:

acquiring a data unit from a PDCP layer of a base station; and transmitting the data unit to a terminal apparatus via an access point of a wireless local area network, using a protocol enabling delivery confirmation.

(Supplementary Note 22)

A computer-readable recording medium storing a program causing a processor to execute:

acquiring a data unit from a PDCP layer of a base station; and transmitting the data unit to a terminal apparatus via an access point of a wireless local area network, using a protocol enabling delivery confirmation.

(Supplementary Note 23)

A program causing a processor to execute:

acquiring a data unit from a PDCP layer of a base station, the data unit being transmitted to a terminal apparatus via an access point of a wireless local area network using a protocol enabling delivery confirmation; and performing reception processing of the data unit in the terminal apparatus.

(Supplementary Note 24)

A computer-readable recording medium storing a program causing a processor to execute:

acquiring a data unit from a PDCP layer of a base station, the data unit being transmitted to a terminal apparatus via an access point of a wireless local area network using a protocol enabling delivery confirmation; and performing reception processing of the data unit in the terminal apparatus.

(Supplementary Note 25)

An apparatus including:

a communication processing unit configured to perform transmission processing in a PDCP layer of a base station; and an information provision unit configured to provide a data unit generated through the transmission processing to a gateway which transmits the data unit to a terminal apparatus via an access point of a wireless local area network using a protocol enabling delivery confirmation.

(Supplementary Note 26)

The apparatus according to Supplementary Note 25, wherein the apparatus is the base station, a base station apparatus for the base station, or a module for the base station apparatus.

(Supplementary Note 27)

The apparatus according to Supplementary Note 25 or 26, wherein the communication processing unit is configured to advance a re-ordering window of the PDCP layer based on the result of delivery confirmation of the protocol.

(Supplementary Note 28)

The apparatus according to any one of Supplementary Notes 25 to 27, wherein the communication processing unit is configured to perform control of congestion between the base station and the terminal apparatus based on information from the protocol.

(Supplementary Note 29)

The apparatus according to Supplementary Note 28, wherein the control includes adjusting an amount of data directly transmitted from the base station to the terminal apparatus and an amount of data transmitted from the base station to the terminal apparatus via the access point.

(Supplementary Note 30)

A method including:

performing transmission processing in a PDCP layer of a base station; and providing a data unit generated through the transmission processing to a gateway which transmits the data unit to a terminal apparatus via an access point of a wireless local area network, using a protocol enabling delivery confirmation.

(Supplementary Note 31)

A program causing a processor to execute:

performing transmission processing in a PDCP layer of a base station; and providing a data unit generated through the transmission processing to a gateway which transmits the data unit to a terminal apparatus via an access point of a wireless local area network, using a protocol enabling delivery confirmation.

(Supplementary Note 32)

A computer-readable recording medium storing a program causing a processor to execute:

performing transmission processing in a PDCP layer of a base station; and providing a data unit generated through the transmission processing to a gateway which transmits the data unit to a terminal apparatus via an access point of a wireless local area network, using a protocol enabling delivery confirmation.

REFERENCE SIGNS LIST 1, 2 System
40 Access point
51, 53, 55 Network
100 Gateway
131, 151 Information acquisition unit
133 Information provision unit
135, 153 Communication processing unit
200 Base station
241 Communication processing unit
251 First communication processing unit
253 Information acquisition unit
255 Information provision unit
257 Second communication processing unit
300 Terminal apparatus
331, 341 First communication processing unit
333, 343, 351 Information acquisition unit
335, 345 Information provision unit
337, 347 Second communication processing unit
353 Communication processing unit

What is claimed is:

1. An apparatus comprising:

a memory storing instructions; and one or more processors configured to execute the instructions to:

acquire a data unit from a Packet Data Convergence Protocol (PDCP) layer of a base station; and transmit the data unit to a terminal apparatus via an access point of a wireless local area network, using a packet of a transport layer protocol enabling delivery confirmation; and provide a result of delivery confirmation of the transport layer protocol to the PDCP layer of the base station;

wherein the delivery confirmation is performed based on a sequence number included in the packet; and wherein the result is provided to the PDCP layer of the base station based on the sequence number included in the packet and correspondence relationship, managed by the apparatus, between the sequence number and a PDCP sequence number.

2. The apparatus according to claim 1, wherein the result of delivery confirmation of the transport layer protocol includes information indicating that delivery of the data unit is acknowledged.

3. The apparatus according to claim 1, wherein the result of delivery confirmation of the transport layer protocol includes information indicating that delivery of the data unit is not acknowledged.

4. The apparatus according to claim 1, wherein the apparatus is a gateway different from the base station, or a module for the gateway.

5. The apparatus according to claim 1, wherein the apparatus is the base station, a base station apparatus for the base station, or a module for the base station apparatus.

6. The apparatus according to claim 5, wherein the one or more processors are configured to execute the instructions to:

perform transmission processing in the PDCP layer; and advance a re-ordering window of the PDCP layer based on the result of delivery confirmation of the transport layer protocol.

7. The apparatus according to claim 5, wherein the one or more processors are configured to execute the instructions to:

perform transmission processing in the PDCP layer; and perform control of congestion between the base station and the terminal apparatus based on information from the transport layer protocol.

8. The apparatus according to claim 7, wherein the control includes adjusting an amount of data directly transmitted from the base station to the terminal apparatus and an amount of data transmitted from the base station to the terminal apparatus via the access point.

9. An apparatus comprising:
a memory storing instructions; and
one or more processors configured to execute the instructions to:
acquire a data unit from a Packet Data Convergence Protocol (PDCP) layer of a base station, the data unit being transmitted to a terminal apparatus via an access point of a wireless local area network, using a packet of a transport layer protocol enabling delivery confirmation; and
perform reception processing of the data unit in the terminal apparatus; and
transmit a delivery confirmation of the transport layer protocol, the delivery confirmation being received from the terminal apparatus by the PDCP layer via the access point of a wireless local area network; and
wherein the delivery confirmation is performed based on a sequence number included in the packet; and
wherein the result is provided to the PDCP layer of the base station based on the sequence number included in the packet and correspondence relationship, managed by the gateway, between the sequence number and a PDCP sequence number.

10. The apparatus according to claim 9, wherein the one or more processors are configured to execute the instructions to receive the data unit using the transport layer protocol.

11. The apparatus according to claim 9, wherein the reception processing includes re-ordering in the PDCP layer.

12. The apparatus according to 9, wherein the one or more processors are configured to execute the instructions to transmit, to the base station, a PDCP status report indicating that the data unit is received.

13. The apparatus according to claim 9, wherein the apparatus is the terminal apparatus, or a module for the terminal apparatus.

14. The apparatus according to claim 9, wherein the transport layer protocol is a Transmission Control Protocol (TCP) or a Stream Control Transmission Protocol (SCTP).

15. A method comprising:
acquiring a data unit from a Packet Data Convergence Protocol (PDCP) layer of a base station; and
transmitting the data unit to a terminal apparatus via an access point of a wireless local area network, using a packet of a transport layer protocol enabling delivery confirmation; and
providing a result of delivery confirmation of the transport layer protocol to the PDCP layer of the base station; and
wherein the delivery confirmation is performed based on a sequence number included in the packet; and
wherein the result is provided to the PDCP layer of the base station based on the sequence number included in the packet and correspondence relationship, managed by the gateway, between the sequence number and a PDCP sequence number.

* * * * *